Feb. 12, 1963 M. S. DU VAL 3,077,318
FISHING REEL WITH ELECTRIC MOTOR DRIVE ATTACHMENT
Filed Feb. 20, 1958

Morris S. DuVal
INVENTOR.

BY Hastings Ackley
ATTORNEY

United States Patent Office 3,077,318
Patented Feb. 12, 1963

3,077,318
FISHING REEL WITH ELECTRIC MOTOR
DRIVE ATTACHMENT
Morris S. Du Val, 4102 Maple Ave., Dallas, Tex.
Filed Feb. 20, 1958, Ser. No. 716,424
2 Claims. (Cl. 242—84.1)

This invention relates to fishing reels and more particularly to an electric power-driven fishing reel.

An object of this invention is to provide a new and improved electric power-driven fishing reel.

Another object of the invention is to provide an electric power-driven fishing reel having an electric motor which is disposed to the side of the fishing reel where it does not affect efficient use and operation of the fishing rod.

Still another object is to provide a conventional fishing reel with an electric motor which is secured to one side of the fishing reel and extends laterally outwardly perpendicular to the fishing rod to which the reel is attached.

A further object of the invention is to provide a fishing reel having a laterally outwardly extending crank shaft and an electric motor mounted on the fishing reel disposed laterally outwardly thereof and having a drive shaft aligned with the crank shaft and connected thereto.

A still further object of the invention is to provide an electric motor and mounting means therefor whereby the electric motor may be detachably connected to a conventional fishing reel.

A still further object of the invention is to provide a new and improved electric motor and mounting means therefor for attachment to a conventional fishing reel which requires no modification of the fishing reel to adapt it for use with the electric motor.

Additional objects and advantages of the invention will be readily apparent from the reading of the following description of a device constructed in accordance with the invention, and reference to the accompanying drawings thereof, wherein.

Figure 1:
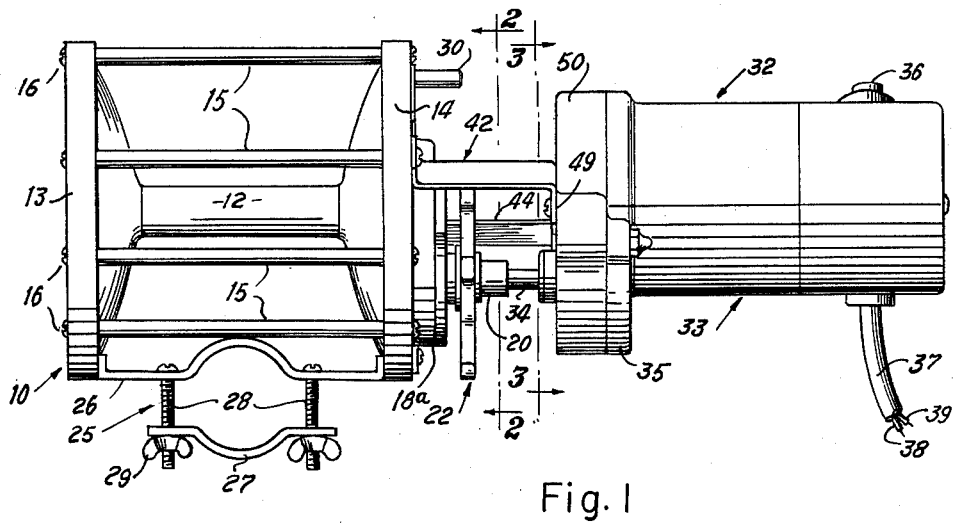
FIGURE 1 is a side view of a fishing reel embodying the invention.
Figure 2:
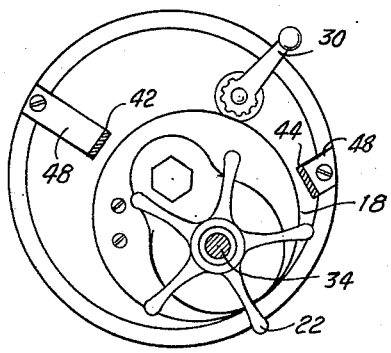
FIGURE 2 is a sectional view taken on line 2—2 of FIGURE 1.
Figure 3:
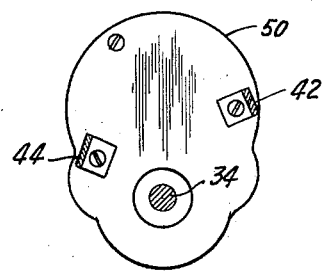
FIGURE 3 is a sectional view taken on line 3—3 of FIGURE 1.
Figure 4:
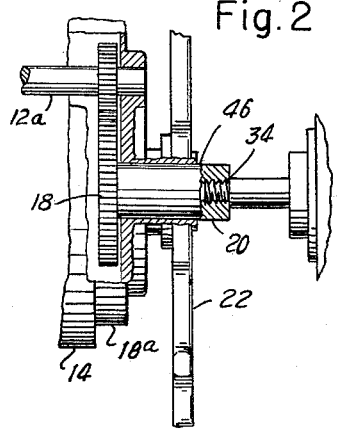
FIGURE 4 is a fragmentary, partly sectional view showing the manner in which the drive shaft of the motor is connected to the crankshaft of the fishing reel.

Referring now to the drawings, the fishing reel 10 includes the usual spool 12 rotatably mounted in side housings 13 and 14 which are rigidly connected together by spacer rods 15 by screws 16 which extend into threaded bores in the ends of the spacer rods 15. The spool 12 is provided with the usual gearing mechanism 18 disposed within the housing 18a and interposed between the supporting shaft 12a of the spool 12 and the drive shaft 20 by means of which the spool is rotated. A star brake mechanism 22 is also provided by means of which the rotation of the spool 12, when the fish is running and unreeling the line from the spool, may be controlled in the usual manner.

The fishing reel may be secured detachably to any suitable fishing rod by means of a clamp 25 which includes a transverse member 26 rigidly secured between the side housings 13 and 14 in any suitable manner and a movable clamp 27 which is detachably secured to the rigid member 26 by means of bolts 28. The bolts 28 extend through aligned apertures in the clamp members 26 and 27 and are provided with wing nuts 29 by means of which the movable clamp member 27 may be moved towards the rigid clamp member 26 when a fishing rod is interposed therebetween to clamp the fishing reel 10 rigidly to the fishing rod. It will be apparent that the clamp members 26 and 27 have oppositely facing curved or bight portions whose curvature corresponds to the curvature of the portion of the fishing rod which they are to abut.

The fishing reel is also provided with the usual control handle 30 rotation of which causes the crankshaft 20 to be engaged or disengaged with the spool 12.

The electric motor 32 is provided with a drive shaft 34 which extends outwardly from a speed reducing mechanism 35 mounted within the same housing as the electric motor 32. The housing 33 within which the motor 32 and the speed reducing mechanism 35 is contained is preferably hermetically sealed so that no malfunction of these components will occur due to corrosion which might otherwise be caused by the exposure of these components to water and salt spray as can very easily occur in the environment in which the fishing reel is employed.

The housing is provided with a control switch 36 at the end remote from the fishing reel and with a flexible cable 37 having a pair of connectors 38 and 39 by means of which the motor 32 may be connected to a suitable source of electric power, such as the battery of a fishing boat. The housing 33 is detachably but rigidly connected to the side housing 14 by a pair of brackets 42 and 44 extending outwardly of the side housing 14 of the reel so that the drive shaft 34 is aligned with the crankshaft 20. The crankshaft 20 is provided with a threaded bore into which the threaded outer end of the drive shaft is received. The threads on the drive shaft 34 are so oriented as to cause the drive shaft to be tightened in the bore 46 of the crankshaft when the motor is energized and rotates the drive shaft.

The brackets 42 are provided with right angularly bent flanges 48 and 49, respectively, which extend in opposite directions and abut the side housing 14 and the motor housing 33, respectively, and are secured thereto by the screws 16 and 50, respectively. The brackets 42 and 44 hold the motor housing 33 in spaced relation to the side housing 14 so that the star brake 22 and the control handle 30 may be operated in the usual manner during fishing operations.

It will be noted that the fishing reel 10 is not in any manner changed or modified to enable the housing 33 to be connected thereto. The connection is accomplished very simply and easily by removing the usual hand crank, not shown, which is secured to the crankshaft 20 by threading into the threaded bore 46 of the crankshaft 20. A pair of the screws 16 which secure the side housing 14 to the connecting rods 15 are then unscrewed to permit the flanges 48 of the brackets 42 and 44 to abut the outer side of the side housing 14 and the screws 16 are then reinserted through aligned apertures in the flanges 48 and the side housing 14 into the threaded bores in the ends of the rods 15. The drive shaft 34 is of course threaded into the bore 46 and the electric powered fishing reel is now ready for attachment to the fishing rod for use therewith in the usual manner.

It will now be seen that a new and improved electric powered fishing reel has been provided which includes a suitable electric driving means mounted on one side of the fishing reel and connected in spaced relationship to the side housing to which it is attached by means of brackets 42 and 44. It will further be noted that the crankshaft 20 of the fishing reel and the drive shaft 34 of the power means are aligned concentrically and parallel to the axis of rotation of the spool 12 of the fishing reel. It will further be noted that the electric power means is disposed to the side of the fishing reel whereby one hand of the fisherman may be held on the fishing rod in the usual manner and the other hand held on the housing 33 adjacent the control switch 36 whereby the operation of the electric motor may be easily controlled by the fisherman. It will also be apparent that the power means for driving the spool 12 of the fishing reel is easily attachable to a conventional fishing reel without the necessity of any structural alteration of such conventional fishing reel.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. The combination with a fishing reel comprising a pair of substantially circular side housing members; a spool rotatably mounted on and between said pair of substantially circular side housing members; a plurality of circumferentially spaced means carried by said side housing members for joining the same together in spaced relation with the spool therebetween; means for securing said side housing members to a fishing rod; means for rotating said spool in said side housing members and comprising a supporting shaft extending between said side housing members and rotatably supporting said spool, a drive shaft carried by and extending laterally outwardly from one of said side housing members and having a threaded socket in its outer end, and drive means carried by said side housing member connecting said drive shaft and said supporting shaft; of power drive means mounted on said reel without altering the structure thereof for driving said drive shaft of said reel and including: electric motor power means adapted to be mounted on said one side housing member of said reel and having a power shaft projecting therefrom; threads on the end of said power shaft threaded into the threaded socket of said drive shaft of said reel for detachably positively connecting said power shaft to the drive shaft, said connection providing one rigid supporting connection between said power means and said reel side housing member; and separate support means detachably connecting said electric motor power means and said one side housing member; said separate support means comprising a pair of brackets, each secured at one end to said electric motor power means and at its opposite end to said one side housing member at a point spaced angularly from said drive shaft of said reel and from the other bracket, each of said brackets having a first flange extending at a right angle from said bracket and abutting said electric motor power means, means connecting one end of said first angularly projecting flange to said electric motor power means, each of said brackets having a second flange at the end thereof opposite said first flange and extending at a right angle from the bracket in a direction opposite the direction in which said first flange extends, said second flange having means at the outer end thereof for connecting it with one of the means joining the side members of the reel, whereby said electric motor power means is rigidly mounted on said side housing member with the power shaft of said electric motor power means in longitudinal axial alignment with and rigidly threadedly connected with the drive shaft of said reel.

2. The combination of claim 1 wherein said electric motor power means has a housing extending laterally from said one side housing member parallel to and in substantial alignment with the supporting shaft of said reel and providing a hand grip, said electric motor power means having a control switch means for controlling energization of the electric motor thereof, said control switch means being mounted on said housing at a point remote from said one side housing member of said reel and accessible when said housing of said electric motor power means is gripped by the user for controlling energization of said electric motor power means.

References Cited in the file of this patent
UNITED STATES PATENTS

| | | |
|---|---|---|
| 415,322 | Follett | Nov. 19, 1889 |
| 1,062,488 | McCluer et al. | May 20, 1913 |
| 1,907,272 | Sipe | May 2, 1933 |
| 2,487,387 | Sears et al. | Nov. 8, 1949 |
| 2,541,876 | Lockwood | Feb. 13, 1951 |
| 2,615,352 | Mies et al. | Oct. 28, 1952 |
| 2,647,341 | Donnell | Aug. 4, 1953 |
| 2,760,736 | Mihalko et al. | Aug. 28, 1956 |